United States Patent
Goldstein et al.

(10) Patent No.: US 9,342,299 B2
(45) Date of Patent: May 17, 2016

(54) DEPLOYMENT OPTIMIZATION FOR ACTIVATION OF SCALED APPLICATIONS IN A MULTI-TENANT PLATFORM-AS-A-SERVICE (PAAS) SYSTEM

(71) Applicant: Red Hat, Inc., Raleigh, NC (US)

(72) Inventors: Andrew Goldstein, Raleigh, NC (US);
Daniel McPherson, Raleigh, NC (US);
Clayton Coleman, Raleigh, NC (US);
Jay Johnson, Arlington, VA (US)

(73) Assignee: Red Hat, Inc., Raleigh, NC (US)

( * ) Notice: Subject to any disclaimer, the term of this patent is extended or adjusted under 35 U.S.C. 154(b) by 41 days.

(21) Appl. No.: 14/189,610

(22) Filed: Feb. 25, 2014

(65) Prior Publication Data
US 2015/0242199 A1    Aug. 27, 2015

(51) Int. Cl.
G06F 9/44 (2006.01)
*G06F 9/445* (2006.01)
*H04L 29/08* (2006.01)
*H04M 1/725* (2006.01)

(52) U.S. Cl.
CPC .. *G06F 8/71* (2013.01); *G06F 8/60* (2013.01); *G06F 8/61* (2013.01); *H04L 67/10* (2013.01); *H04M 1/72525* (2013.01)

(58) Field of Classification Search
CPC ............. G06F 8/60; G06F 8/61; H04L 67/10; H04M 1/72525
See application file for complete search history.

(56) References Cited

U.S. PATENT DOCUMENTS

| 8,006,243 B2 * | 8/2011 | Lum | G06F 9/4411 717/177 |
| 2003/0066065 A1 * | 4/2003 | Larkin | G06F 8/65 717/177 |
| 2005/0262499 A1 * | 11/2005 | Read | G06F 8/67 717/177 |
| 2008/0092131 A1 * | 4/2008 | McIntyre | G06F 9/4443 717/172 |
| 2011/0126187 A1 * | 5/2011 | Alberti | G06F 8/65 717/172 |
| 2012/0102486 A1 * | 4/2012 | Yendluri | G06F 9/5072 717/177 |
| 2014/0130036 A1 * | 5/2014 | Gurikar | G06F 8/61 717/176 |
| 2014/0215452 A1 * | 7/2014 | Hicks | G06F 8/67 717/172 |

OTHER PUBLICATIONS

Duncan Lee Miller et al., Development of Resource-Constrained Sensors and Actuators for In-Space Satellite Docking and Servicing, Jun. 2015, retrieved online on Jan. 11, 2016, pp. 1-193. Retrieved from the Internet: <URL: http://ssl.mit.edu/files/website/theses/SM-2015-MillerDuncan.pdf>.*
Hao Wei et al., Elastic Resource Management for Heterogeneous Application on PaaS, Oct. 2013, retrieved online on Jan. 11, 2016, pp. 1-7. Retrieved from the Internet: <URL: http://delivery.acm.org/10.1145/2540000/2532451/a7-wei.pdf?>.*

* cited by examiner

*Primary Examiner* — Thuy Dao
*Assistant Examiner* — Hanh T Bui
(74) *Attorney, Agent, or Firm* — Lowenstein Sandler LLP (57) ABSTRACT

A mechanism for optimization of deployment of applications for activation in a multi-tenant Platform-as-Service (PaaS) system is disclosed. A method of the disclosure includes receiving, by a processing device, a request for deployment of an application source code on a node. The node is provided by the PaaS system. The method also includes implementing, by the processing device, a build, prepare and distribute functionality to convert the application source code into a build result prepared for distribution as a deployment artifact code. The method further includes implementing, by the processing device, a deployment functionality to activate the deployment artifact for the deployment in the node by not incurring downtime.

9 Claims, 7 Drawing Sheets

DEPLOYMENT OPTIMIZATION FOR ACTIVATION OF SCALED APPLICATIONS IN A MULTI-TENANT PLATFORM-AS-A-SERVICE (PAAS) SYSTEM

TECHNICAL FIELD

The embodiments of the disclosure relate generally to platform-as-a-service environments and, more specifically, relate to deployment optimization for activation of scaled applications in a multi-tenant PaaS system.

BACKGROUND

Currently, a variety of Platform-as-a-Service (PaaS) offerings exists that include software and/or hardware facilities for facilitating the execution of web applications in a cloud-computing environment (the "cloud"). Cloud computing is a computing paradigm in which a customer pays a "cloud provider" to execute a program on computer hardware owned and/or controlled by the cloud provider. It is common for a cloud provider to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicates with the executing program from remote geographic locations using Internet protocols.

PaaS offerings typically facilitate deployment of applications, provision hosting capabilities, provide the facilities to support the complete life cycle of building and delivering applications and services. Typically, these facilities operate as one or more virtual machines (VMs) running on top of a hypervisor in a host server.

A naïve approach to application deployment that a PaaS provider may offer is to stop the application, apply new code, build, deploy, activate and restart the application. As such, the application is taken offline temporarily causing notable downtime between the stop and the restart, which can lead to incoming requests failing during this period.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for a mechanism for optimization of deployment for activation of scaled applications in a multi-tenant PaaS system. The scaled application may refer to scaling of applications in change of size (e.g. add/remove gears for the application). The deployment optimization described in embodiments of the disclosure may provide support for activation of applications in a PaaS system without downtime. In one embodiment, when a software developer or end user deploys an application on the PaaS system, including making a code change in the application, they may provide updated source code for the application to the PaaS environment. Embodiments of the disclosure introduce functionality to support optimized deployment (hereinafter "deployment") of the application including updates of the application without downtime for activation.

In one embodiment, deployment support is provided via a coordinator component of the application. The coordinator component may be a gear for the application. In one embodiment, the coordinator component builds the application and distributes it for activation. The coordinator component provides functionality (such as configuration templates, scripts, dependencies) to run an application and/or add a feature to an application and implements deployment functionality so that the application is deployed without downtime. Deployment of an application allows for updates to the application's source code to take effect without down time of the application, to minimize total amount of deployment time for the application.

In one embodiment, a method of the disclosure includes receiving a request for deployment of an application source code on a node. The node is provided by the multi-tenant PaaS system. The method also includes implementing, by a coordinator component, a build, prepare and distribute functionality to convert the application source code for the application into a build result prepared for distribution as a deployment artifact. The method further includes implementing, by the coordinator component, a deployment functionality to activate the deployment artifact in the node by not incurring downtime.

Prior solutions for optimizing deployment of the applications for activation include the PaaS platform to generally stop, build, deploy, activate, and restart the application to deploy the code or implement the code changes. As such, the application is taken offline temporarily causing a significant downtime between the stop and the restart, which leads to incoming requests to fail during this period. Embodiments of the present disclosure overcome these disadvantages by optimizing deployment of the applications to avoid downtime and to minimize the deployment time for activation of the applications.

Figure 1:
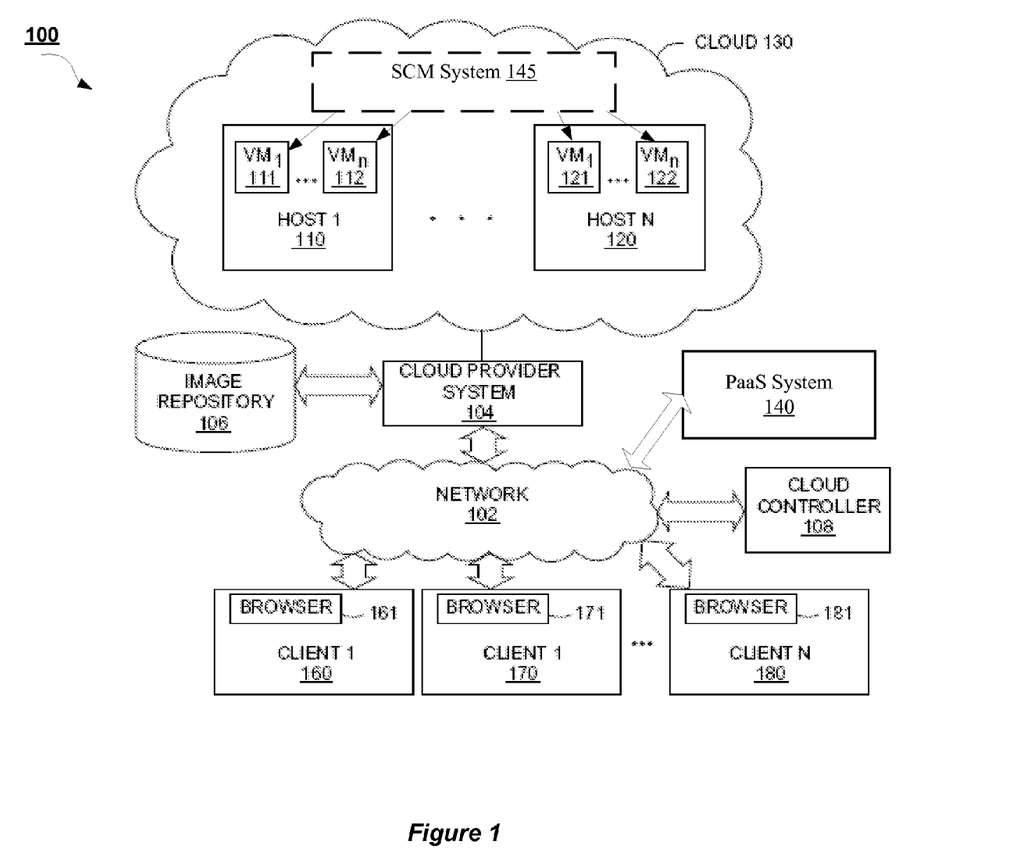
FIG. 1 is a block diagram of a network architecture in which embodiments of the disclosure may operate.

FIG. 1 is a block diagram of a network architecture 100 in which embodiments of the disclosure may operate. The network architecture 100 includes a cloud 130 managed by a cloud provider system 104. The cloud provider system 104 provides VMs, such as VMs 111, 112, 121, and 122 hosted in cloud 130. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 140. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

In one embodiment, each VM 111, 112, 121, 122 running applications for the PaaS provider controller 140 includes a source code management (SCM) system 145, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. SCM system 145 on VMs 111, 112, 121, 122 stores the remote repositories for each application running on the VM 111, 112, 121, 122, so that the application code may be edited by others with access, or the application may be executed by the VM 111, 112, 121, 122.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
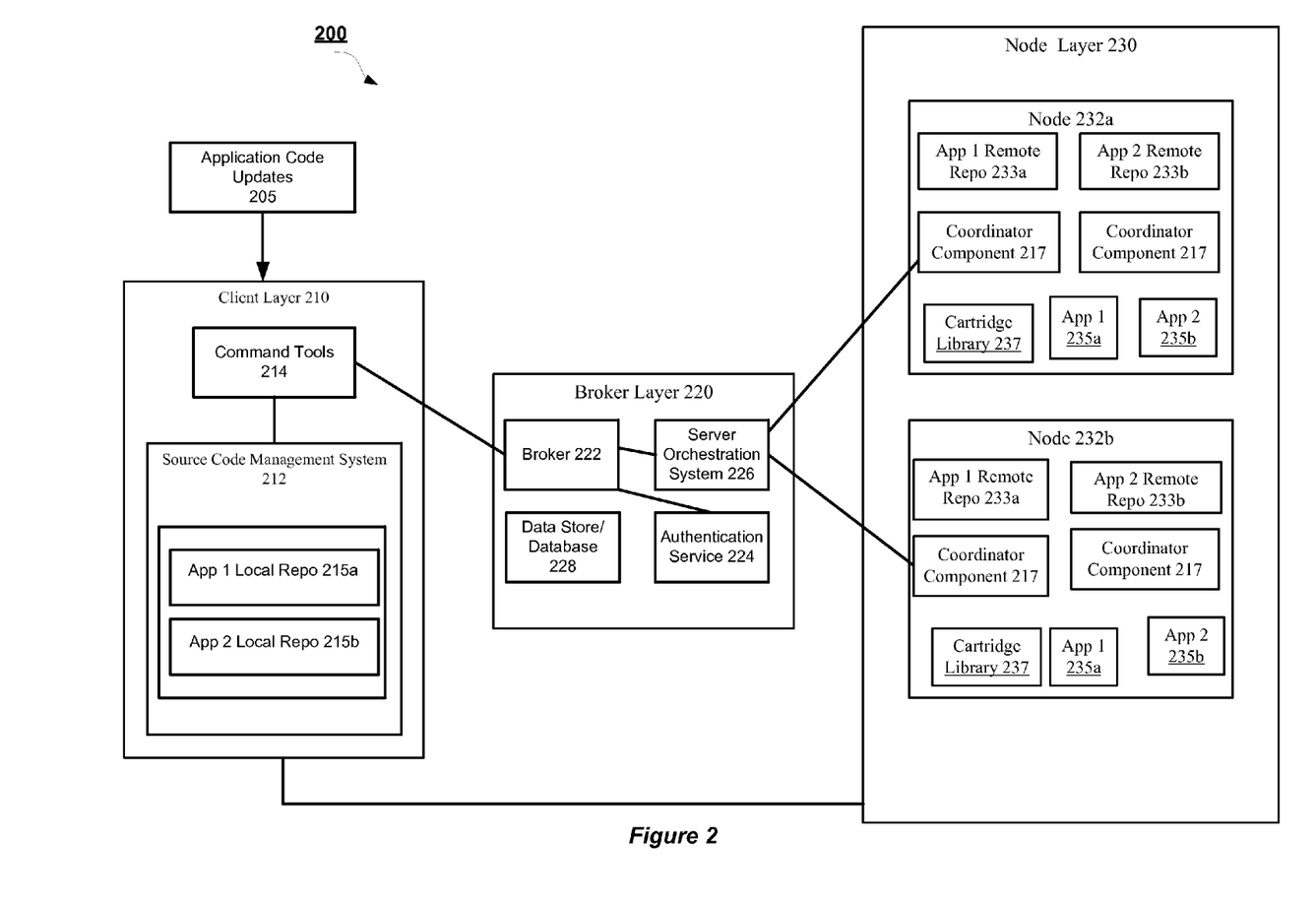
FIG. 2 is a block diagram of a PaaS system architecture according to an embodiment of the disclosure.

FIG. 2 is a block diagram of a PaaS system architecture 200 according to an embodiment of the disclosure. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system and a local software repository 215a, 215b, for storing the changes for each application associated with the end user of the PaaS system 200. The packaged software application can then be "pushed" from the local SCM repository 215a, 215b to a remote SCM repository 233a, 233b, at the node(s) 232a, 232b, running the associated application. From the remote SCM repository 233a, 233b, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 communicate with an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232a-b on which software applications 235a-b are provisioned and executed. In one embodiment, each node 232a-b is a VM provisioned by an Infrastructure as a Service (IaaS) provider, such as Amazon™ Web Services. In other embodiments, the nodes 232a-b may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is application creation. In one embodiment, when a user, using the command tools 214 at client layer 210, requests the creation of an application 235a-b, or some other action (such as changes in currently running application) to manage the application 235a-b, the broker 222 first authenticates the user using an authentication service 224. In one embodiment, the authentication service may comprise custom authentication methods, or standard protocols such as SAML, Oauth, etc. Once the user has been authenticated and allowed access to the system by authentication service 224, the broker 222 uses a server orchestration system 226 to collect information and configuration information about the nodes 232a-b.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232a-b, which are acting as application servers and web servers.

For example, if the broker 222 wanted to shut down all applications 235a-b on all even numbered nodes out of 100,000 nodes, the broker 222 may provide one command to the server orchestration system 226. Then, the server orchestration system 226 generates and distributes a message to all nodes 232a-b to shut down all applications 235a-b if the node 232a-b is even, using a messaging and queuing system. Thus, in one embodiment, the broker 222 manages the business logic and model representing the nodes 232a-b and the applications 235a-b residing on the nodes, and acts as a controller that generates the actions requested by users via an API of the client tools 214. The server orchestration system 226 then takes the actions generated by the broker 222 and orchestrates their execution on the many nodes 232a-b managed by the system.

In one embodiment, the information collected about the nodes 232a-b can be stored in a data store 228. In one embodiment, the data store 228 can be a locally-hosted database or file store, or it can be a cloud based storage service provided by a Software-as-a-Service (SaaS) provider, such as Amazon™ S3™ (Simple Storage Service). The broker 222 uses the information about the nodes 232a-b and their applications 235a-b to model the application hosting service and to maintain records about the nodes. In one embodiment, data of a node 232a-b is stored in the form of a JavaScript Object Notation (JSON) blob or string that maintains key-value pairs to associate a unique identifier, a hostname, a list of applications, and other such attributes with the node.

In embodiments of the disclosure, the PaaS system architecture 200 of FIG. 2 is a multi-tenant PaaS environment. In a multi-tenant PaaS environment, each node 232a-b runs multiple applications 235a-b that may be owned or managed by different users and/or organizations. As such, a first customer's deployed applications 235a-b may co-exist with any other customer's deployed applications on the same node 232 (VM) that is hosting the first customer's deployed applications 235a-b. In some embodiments, portions of an application are running on multiple different nodes 232a-b. For example, as shown in FIG. 2, components of application 1 235a run in both node 232a and node 232b. Similarly, application 2 235b runs in node 232a and node 232b.

In addition, each node also maintains a cartridge library 237. The cartridge library 237 maintains multiple software components (referred to herein as cartridges) that may be utilized by applications 235a-b deployed on node 232a-b. A cartridge can represent a form of support software (or middleware) providing the functionality, such as configuration templates, scripts, dependencies) to run an application 235a-b and/or add a feature to an application, 235a-b. In one embodiment, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235a-b provides a capability for the application 235a-b, without the customer who owns the application having to administer or update the included capability.

In embodiments of the disclosure, an end user of PaaS system 200 may provide application code updates 205 to one or more applications 235a, 235b, of the end user hosted by PaaS system 200. The application code updates 205 may include a coordinator component 217 that indicates the application 235a, 235b, is to be deployed using an optimized deploy (hereinafter "deploy") functionality. In one embodiment, the coordinator component 217 builds the application and distributes it for activation. In other embodiments, mechanisms other than a coordinator component trigger the deployment, such as an environmental variable or any other trigger mechanism.

In one embodiment, deployment functionality refers to an ability to optimize speed of activation of the application. When the end user creates a new application, the coordinator component 217 is automatically created in each of the nodes 232a, 232b. The packaged software application, including the coordinator component 217, can then be provided (e.g., "pushed") from the local SCM repository 215a, 215b, to a remote SCM repository 233a. In some embodiments, there is a remote SCM repository 233a, 233b, on each node 232a, 232b that the application 235a, 235b executes. The remote SCM repositories 233a, 233b store the application for editing and/or for execution on the node 232a, 232b.

In one embodiment, the coordinator component 217 is a gear for the application. The coordinator component 217 is responsible for deployment functionality across a variety of different cartridge types that an application 235a, 235b may run, irrespective of the type of cartridge. As a result, an end user of the PaaS platform does not have to be aware of or implement deployment functionality in each cartridge instance type that application 235a, 235b may use. Instead, the coordinator component 217 and the PaaS platform 200 take care of all tasks related to deployment.

Figure 3:
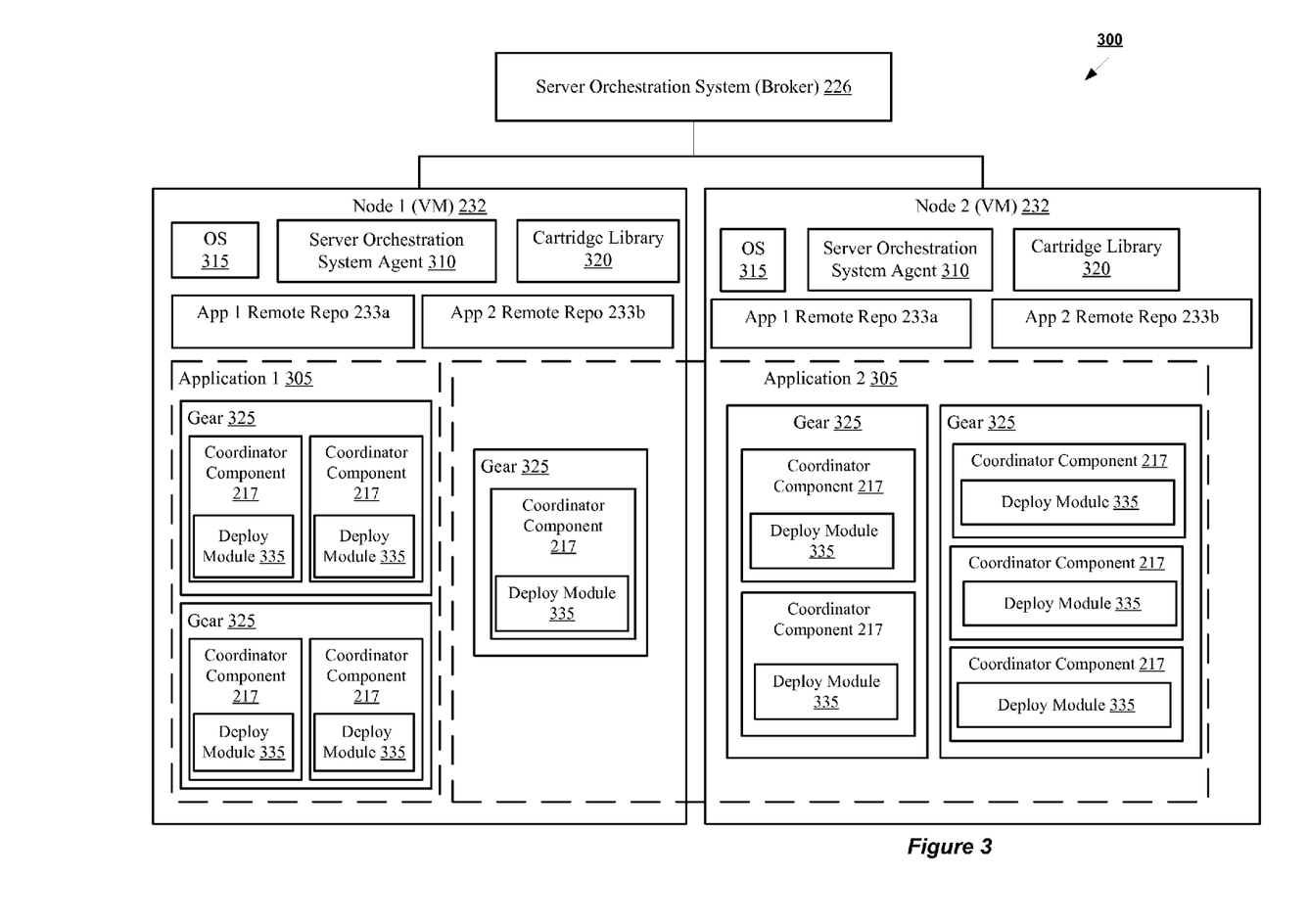
FIG. 3 is a block diagram of depicting a communication infrastructure between a server orchestration system and a plurality of nodes according to embodiments of the disclosure.

FIG. 3 is a block diagram depicting a communication infrastructure 300 between a server orchestration system 226 and a plurality of nodes 232 according to embodiments of the disclosure. In one embodiment, server orchestration system 226 and nodes 232 are the same as their counterparts described with respect to FIG. 2. In one embodiment, each node 232 is implemented as a VM and has an operating system 315 that can execute applications 305 using the cartridge library 320 that are resident on the nodes 232. In one embodiment, applications 305 are the same as applications 235a-b described with respect to FIG. 2.

Each node 232 also includes a server orchestration system agent 310 configured to track and collect information about the node 232 and to perform management actions on the node 232. Thus, in one embodiment, using MCollective™ as the server orchestration system 226, the server orchestration system agent 310 can act as a MCollective™ server. The server orchestration system 226 then acts as the MCollective™ client that can send requests, queries, and commands to the MCollective™ server on node 232.

As previously mentioned, cartridges provide the underlying support software that implements the functionality of applications 305. In one embodiment, an application 305 may utilize one or more cartridge instances 330 that are run in one or more resource-constrained gears 325 on nodes 232. Cartridge library 320 provides an OS 315-based location, outside of all application gears 325, that acts as a source for cartridge instantiations 330 that provide functionality for an application 305. An application 305 may use more than one cartridge instance 330 as part of providing functionality for the application 305. One example of this is a JavaEE application that uses a JBoss™ AS7 cartridge with a supporting MySQL™ database provided by a MySQL™ cartridge. Each cartridge instance may include a software repository that provides the particular functionality of the cartridge instance 330.

A gear 325 is a resource-constrained process space on the node 232 to execute functionality of an application. In some embodiments, a gear 325 is established by the node 232 with resource boundaries, including a limit and/or designation of the amount of memory, amount of storage, and security types and/or labels to be applied to any functions executed by the gear 325. In one embodiment, gears 325 may be established using the Linux Containers (LXC) virtualization method. In further embodiments, containers may also be established using cgroups, SELinux™, and kernel namespaces, to name a few examples.

In some embodiments, a gear 325 is also known as a container. In some embodiments, cartridges instances for an application 305 may execute in gears 325 dispersed over more than one node 232. In other embodiments, cartridge instances for an application 305 may run in one or more gears 325 on the same node 232.

Nodes 232 may also include remote SCM repositories 233a, 233b for each application 305 running on the node 232. The remote SCM repositories 233a, 233b are the same as their counterparts described with respect to FIG. 2.

In one embodiment, when updated application source code is received (e.g. via a 'push' operation) in an application's remote SCM repository 233a, 233b, the remote SCM repository 233a, 233b invokes coordinator component 217 to run a number of hooks to build, prepare and distribute the application.

As discussed above, a build is executed for the application code. A build is a process that converts source code into a build result. A build result is eventually prepared for deployment, distributed to some or all of an application's gears, and finally activated on those gears. The prepare and distribute may happen immediately as part of the workflow, wherein the coordinator component 217 builds the application and distributes it. A build result includes the application code and/or anything produced by the application's build process (e.g. a .war file). The build result may represent the state of the repositories 233a, 233b, and the dependencies on the gear 325 after the build has been executed.

In one embodiment, preparing a build result for deployment involves the execution of a prepare platform action and a user-defined prepare action hook (if one exists). If the prepare platform action is passed a file as an input, it extracts the file into the specified deployment directory. The prepare user action hook is part of the application's source code in which users may execute custom code to modify the build result prior to its distribution to the application's gears. An example use case for the prepare action hook is using it to download environment-specific files that do not belong in the application's repository to the build result directory. In another example, a use case for the prepare action hook is creating a unique identifier and a symlink for the unique identifier. A symlink is a special type of file that contains a reference to another file or directory. In one embodiment, the build result may be compressed to minimize disk space usage.

A build result that has been prepared for distribution is a deployment artifact. As discussed above, the deployment artifacts have unique identifiers that are created by the prepare platform action after the user-defined prepare action hook has been executed. Once the deployment artifact has been created, it may be distributed to some or all of an application's gears. In one embodiment, the deployment artifact is copied to the gears.

For example, in the case of a git SCM system, a post-receive git hook is setup on the remote Git repository 233a, 233b that calls into the coordinator component 217 to perform the deployment process. The coordinator component 217 calls into cartridge hooks associated with the cartridges 330 to allow the cartridges 330 to execute cartridge-specific build logic. The coordinator component 217 builds the application 305 for distribution as a deployment artifact. In one embodiment, the functionality to implement deployment of the deployment artifact is represented at deploy module 335.

In some embodiments, the deploy module 335 functions to activate the applications 305 for deployment without down time. This may include not stopping execution of the application to avoid downtime. In one embodiment, "without down time" may refer to zero down time. The deploy module 335 activates the deployment artifact for deployment, making it the active code running for a gear. As discussed above, a deployment artifact is the built and prepared result.

In one embodiment, when activating the deployment artifact, a scale-replace method is used. A scale-replace method may include creating a new gear and the deleting an old gear. As discussed above, a gear is a resource-constrained process space on the node to execute functionality of an application. In one embodiment, the application has at least one gear (i.e. first gear) before the activation is started. A new gear is created to host the new deployment artifact. The deployment artifact is copied into the newly created gear, which is later started for execution. The first gear is deleted after successful execution of the deployment artifact in the new gear. Accordingly, the gears are scaled down, which results in additional disk space available on the node. As such, more space may be needed, for example with two gears during the deployment than before or after the deployment with one gear.

The minimum time to deploy the deployment artifact for the activation without downtime using the scale-replace method is described by:

$$T_{sp}(deploy) = (N(gears)/N(extra\_cap) - 1) * (T(gear\_create) + T(gear\_deploy) + T(gear\_activate))$$

where N(gears) is the number of gears in the application, N(extra_cap) is the extra capacity in number of gears, T(gear_create) is the time to create a new gear with an instance of the cartridges, T(gear_deploy) is the time to copy the deployment artifact onto disk from the source, and T(gear_activate) is the time to swap the artifact to the newly deployed version and start the gear.

In another embodiment, when activating the deployment artifact, an in-place method is used. The in-place method may include preserving all the gears before the activation is started. Accordingly, the scale factor of the gears may or may not be altered since the total number of gears remains the same. The in-place method may also include storing the deployment artifact at a temporary location (such as a deployment directory) and stopping execution of at least one gear among all the gears. The in-place method may further copy the deployment artifact from the temporary location into a run time directory of at least one gear (the gear in which the execution is stopped), which is distributed to the rest of the gears. Then, all the gears are started for execution with the deployment artifact.

The minimum deployment time to deploy the deployment artifact for activation without down time using the in-place method is:

$$Tinp(\text{deploy}) = (N(\text{gears})/(N(\text{extra\_cap}) + N(\text{fraction})) - 1) * (T(\text{gear\_activate}))$$

as the gear_deploy may be executed before the deployment begins. N(fraction)=N(gears)*number of gears that are allowed to be down at any given point in time. For example, there are 10 gears and only 1 gear is allowed to be down at a time. As such, there will be (10/(0+(10*0.1)))−1*activate time=9*T(gear_activate).

In one embodiment, similar methodology as discussed above with respect to the in-place method for "roll back" of the deployment artifact as an activation. In some embodiments, when all the gears are preserved and previous deployment artifacts are retained, roll back of the active deployment artifact to a previous deployment artifact may be executed. In one embodiment, the roll back includes stopping execution of the application in a subset of the application's gears, returning back to a previous deployment directory, and invoking an activate command for a previous deployment ID in order to activate a previous deployment artifact.

In one embodiment, a user may disable automatic deployments of the applications and choose instead to deploy the applications via the methods described above.

In some embodiments, the node 230 generates the current deployment status of the application deployed and provides it to the broker layer 220. The current status may include details of the successful and failed deployments.

In one embodiment, the broker 220 maintains the current status of all the application's gears 325, including the current deployment ID and information about previous deployments. Whenever a deployment or rollback of the application succeeds, the node 232 informs the broker 220 of the application's gear 325 deployments. In one embodiment, the broker 220 may provide the current status of the application gear 325 to the client layer 210. In one example, the broker may send the current status of the application gear to the client layer 210 upon request from the client. In another example, the broker 220 may automatically send the current status of the application gear 325 to the client layer 210.

In one embodiment, the broker 220 may not be available. In such embodiment, a "fall back" mode is implemented where a deployment or the roll back of the applications are directed by an external tool connected to the nodes 232 using the capabilities available on the gears 325. This may be accomplished by ensuring that the build, prepare, distribute, and activate steps can be invoked by direct connection to the node 232. Such steps may be invoked in any gear 325 with the Git repository 233a, 233b to any coordinator component 217. In one embodiment, the reporting and coordination of the requests from the client layer 210 with actions to be performed at the node layer may be maintained by an external tool.

Figure 4:
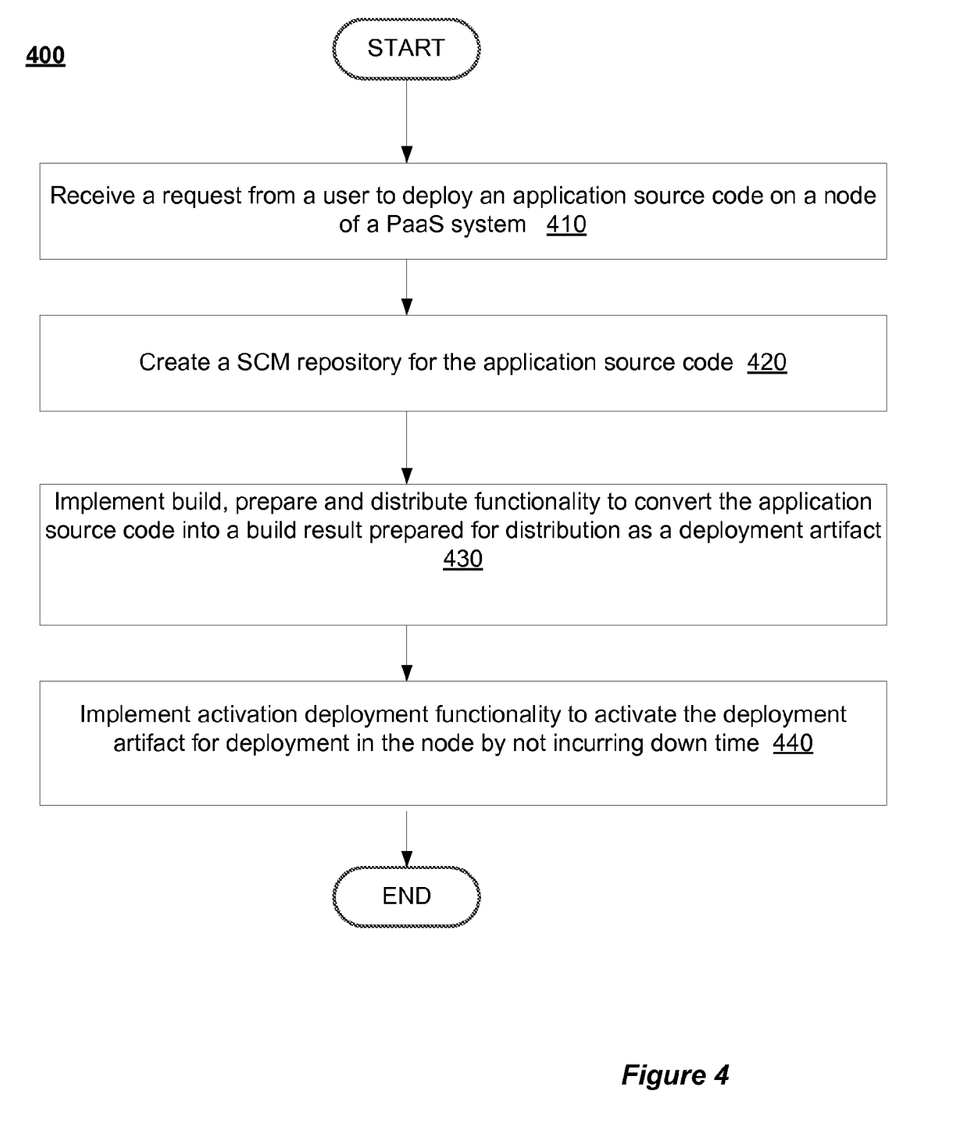
FIG. 4 is a flow diagram illustrating a method for optimizing deployment for activation of the scaled applications in a multi-tenant PaaS system according to an embodiment of the disclosure.

FIG. 4 is a flow diagram illustrating a method 400 for optimizing deployment for activation of the applications in a multi-tenant PaaS system according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by nodes 232 described with respect to FIGS. 2 and 3.

Method 400 begins at block 410, where a request for deployment of an application source code on a node of a multi-tenant PaaS system is received from an end user. The request may be provided to a broker of the multi-tenant PaaS system from the end user, via command line tools or by communicating directly with application interface (API) of the broker. At block 420, a SCM repository is created for the application source code. Once the SCM repository is created, the user may "git push" changes to the application source code in the SCM repository. As discussed above, the SCM repository is a git remote repository maintained on a node of the multi-tenant PaaS system.

At block 430, build, prepare and distribute functionality is implemented to convert the application source code into a build result prepared for distribution as a deployment artifact. As discussed above, a build is run for the application code. A build is a process that converts source code of the application into a build result. A build result is eventually prepared for deployment, distributed to some or all of an application's gears, and finally activated on those gears. The prepare and distribute may happen immediately as part of the work flow, wherein the coordinator component 217 builds the application and distributes it. A build result that has been prepared for distribution is the deployment artifact.

At block 440, deployment functionality is implemented to activate the deployment artifact for deployment in the node by not incurring down time. In one embodiment, the "not incurring downtime" is "without down time", which refers to zero down time. The deployment functionality activates the deployment artifact for deployment making it the active code running for a gear.

Figure 5:
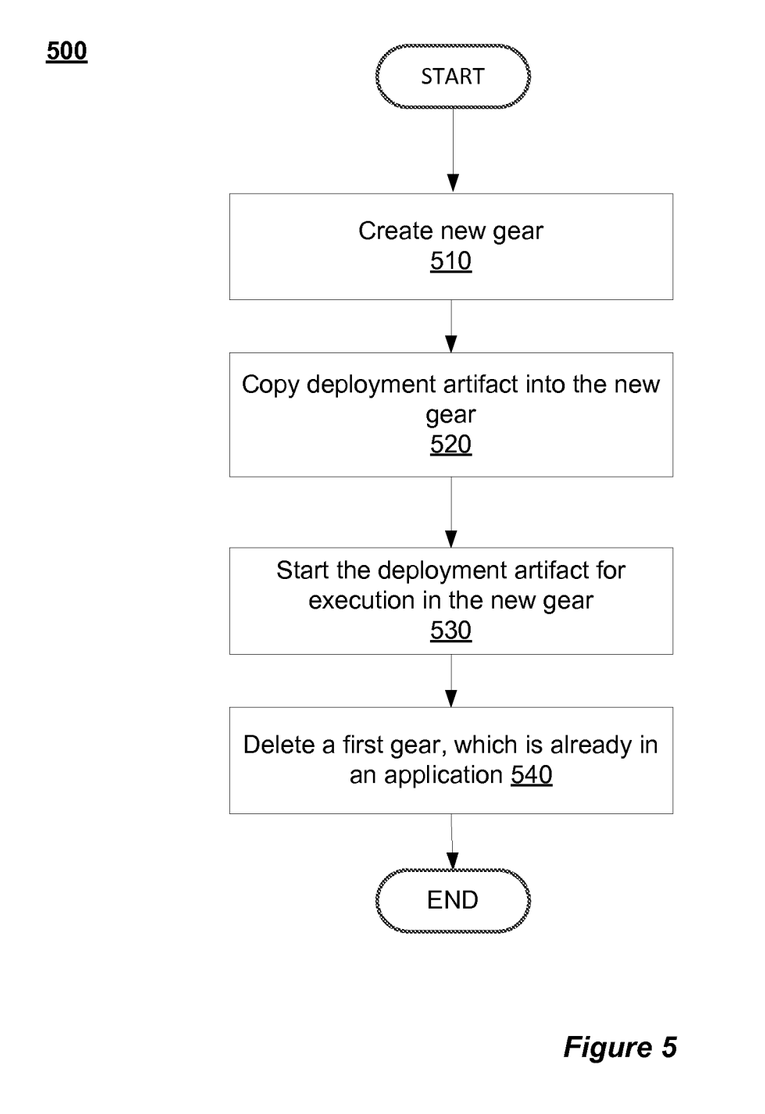
FIG. 5 is a flow diagram illustrating a method for optimizing deployment for activation of the scaled applications in a multi-tenant PaaS system according to an embodiment of the disclosure.

FIG. 5 is a flow diagram illustrating a method 500 for activating applications for deployment without down time in a multi-tenant PaaS system according to an embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is the scale-replace method performed by the deploy module 335 in the gear 325 of the node 232 described with respect to FIG. 3.

At block 510, a new gear is created to host the updated application source code. As discussed above, a gear is a resource-constrained process space on the node to execute functionality of an application. In one embodiment, the application has at least one gear (i.e. first gear) before the activation is started. In one embodiment, the first gear hosts a currently-executing application. At block 520, a deployment artifact, which is ready for deployment, is copied into the new gear. At block 530, the deployment artifact is started for execution in the new gear. At block 540, the first gear, which is already in the application is deleted. In one embodiment, the first gear is deleted after successful execution of the deployment artifact in the new gear.

The minimum deployment time to deploy the deployment artifact without down time using the method 500 is described by:

$$Tsp(\text{deploy}) = (N(\text{gears})/N(\text{extra\_cap}) - 1) * (T(\text{gear\_create}) + T(\text{gear\_deploy}) + T(\text{gear\_activate})),$$

where N(gears) is the number of gears in the application, N(extra_cap) is the extra capacity in number of gears, T(gear_create) is the time to create a new gear with an instance of the cartridges, T(gear_deploy) is the time to copy the deployment artifact onto disk from the source, and T(gear_activate) is the time to swap the artifact to the newly deployed version and start the gear.

Figure 6:
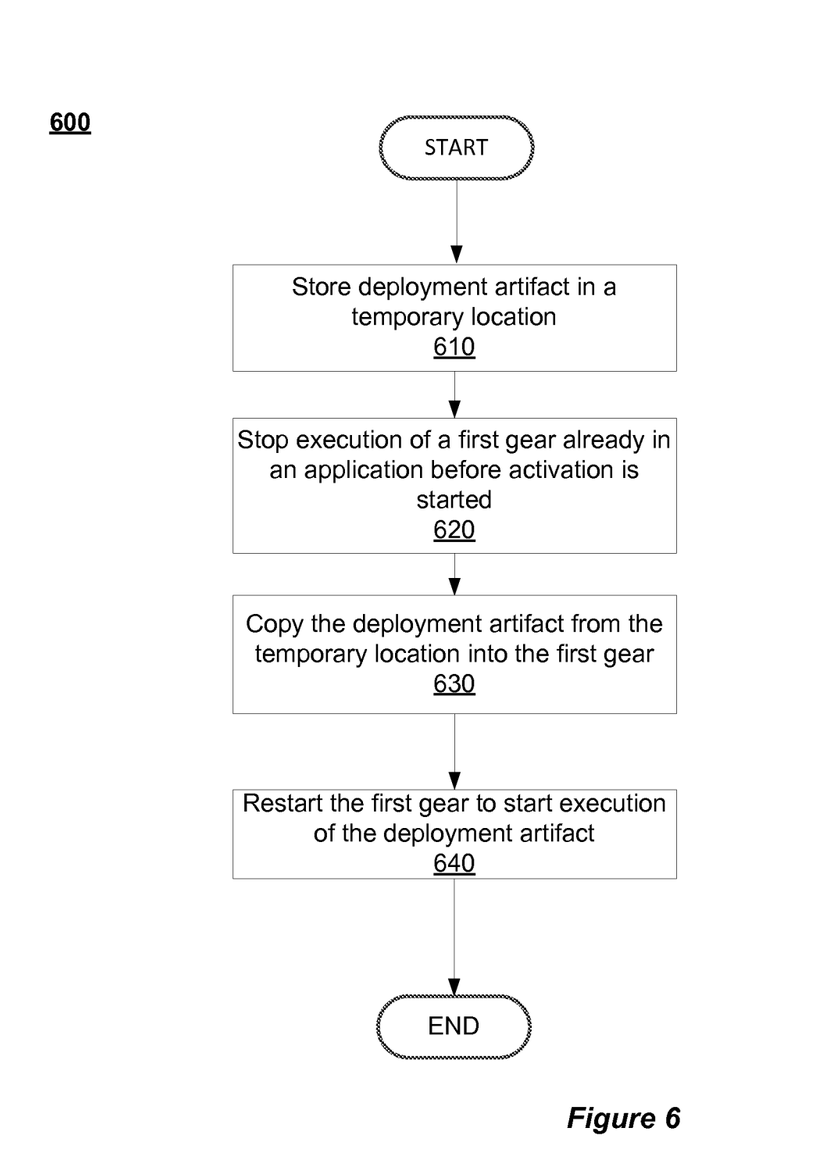
FIG. 6 is a flow diagram illustrating a method for optimizing deployment for activation of the scaled applications in a multi-tenant PaaS system according to an embodiment of the disclosure.

FIG. 6 is a flow diagram illustrating a method 600 for activating applications for deployment without down time in a multi-tenant PaaS system according to an embodiment of the disclosure. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is the in-replace method performed by the deploy module 335 in the gear 325 of the node 232 described with respect to FIG. 3.

At block 610, the deployment artifact, which is ready for deployment, is stored at a temporary location. A temporary location may be a deployment directory. At block 620, execution of at least one gear (i.e. first gear) already in the application is stopped. As discussed above, the application has the first gear before the activation is started. Also as discussed above, a gear is a resource-constrained process space on the node to execute functionality of an application. At block 630, the deployment artifact from the temporary location is copied from the temporary location into deployment directory in the first gear. At block 640, the first gear is restarted for execution of the deployment artifact.

The minimum deployment time to deploy the deployment artifact without down time using the method 600 is:

$$Tinp(deploy)=(N(gears)/(N(extra\_cap)+N(fraction))-1)*(T(gear\_activate)),$$

as the gear_deploy may be executed before the deployment begins. N(fraction)=N(gears)*number of gears that are allowed to be down at any given point in time.

Figure 7:
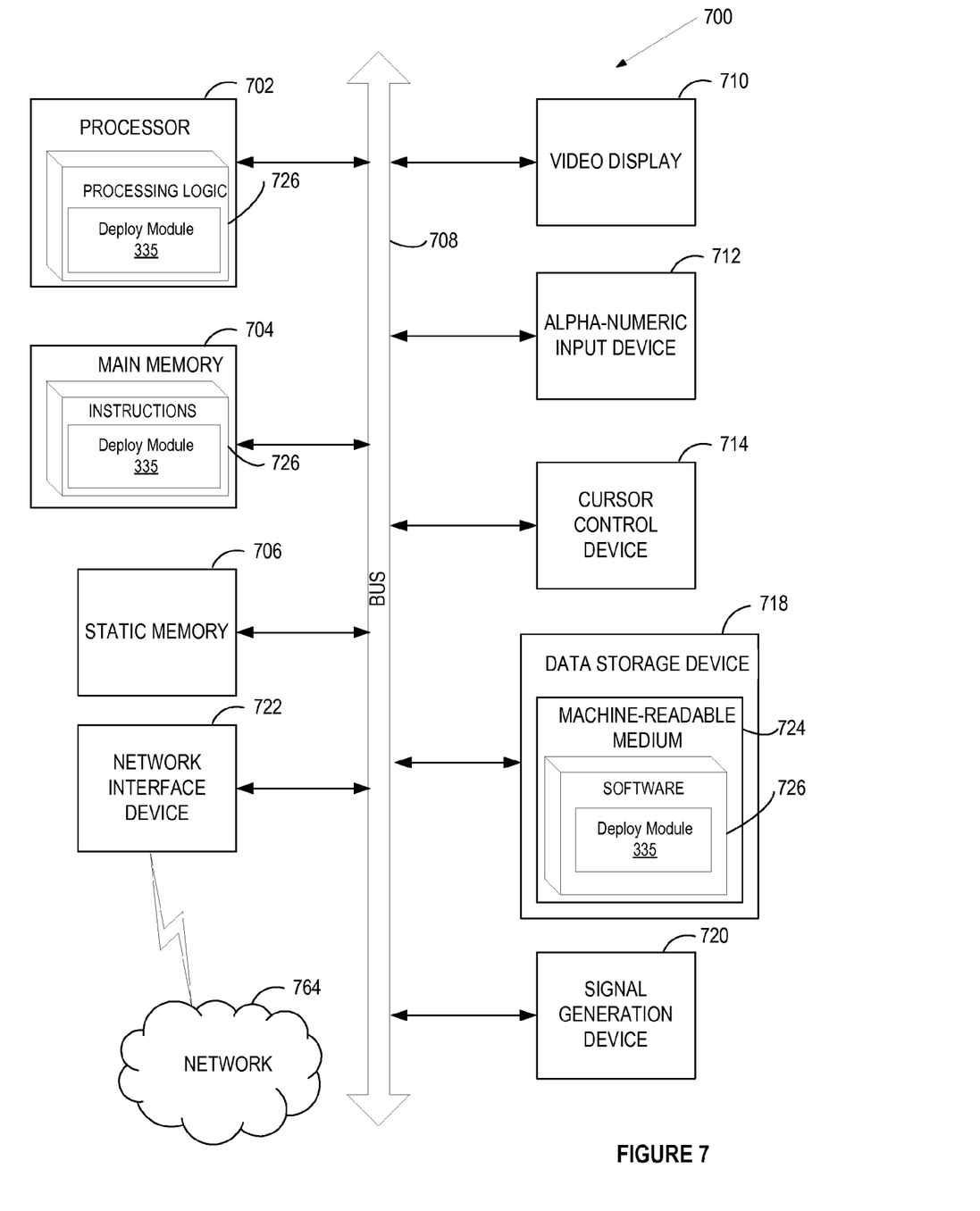
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 700 includes a processing device 702 (e.g., processor, CPU, etc.), a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 722 communicably coupled to a network 764. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a machine-accessible storage medium 724 on which is stored software 726 embodying any one or more of the methodologies of functions described herein. The software 726 may also reside, completely or at least partially, within the main memory 704 as instructions 726 and/or within the processing device 702 as processing logic 726 during execution thereof by the computer system 700; the main memory 704 and the processing device 702 also constituting machine-accessible storage media.

The machine-readable storage medium 724 may also be used to store instructions 726 to implement a deploy module to perform deployment optimization in a multi-tenant PaaS system, such as the deploy module 335 described with respect to FIG. 3, and/or a software library containing methods that call the above applications. While the machine-accessible storage medium 724 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "creating", "activating", "providing", "executing", "copying", "storing", "symlinking", "stopping", "restarting", 'deleting', "implementing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   receiving, by a processing device, a request for deployment of application source code in a node, wherein the node is provided by a multi-tenant Platform-as-a-Service (PaaS) system, wherein each gear of a plurality of gears is a resource-constrained process space on the node to execute functionality of an application, wherein a first gear hosts a currently-executing application;
   converting the application source code into a build result prepared for distribution as a deployment artifact by implementing, by the processing device, a first functionality on the application source code; and
   activating the deployment artifact for the deployment in the node without downtime by implementing, by the processing device, a deployment functionality on the deployment artifact, wherein the activating comprises:
   creating a second gear to host the deployment artifact;
   copying the deployment artifact into the second gear;
   executing the deployment artifact in the second gear; and
   deleting the first gear after execution of the deployment artifact in the second gear.

2. The method of claim 1, wherein the deployment of the application source code comprises at least one of creation of a new application or updating the currently-executing application.

3. The method of claim 1 wherein time to activate the deployment artifact for the deployment comprises:

$$Tsp(\text{deploy})=(N(\text{gears})/N(\text{extra\_cap})-1)*(T(\text{gear\_create})+T(\text{gear\_deploy})+T(\text{gear\_activate}))$$

where N(gears) is a number of gears in the application, N(extra_cap) is an extra capacity in number of gears, T(gear_create) is a time to create the second gear with an instance of cartridges, T(gear_deploy) is a time to copy the deployment artifact onto disk from the source, and T(gear_activate) is a time to swap the artifact to a newly deployed version and start the second gear, wherein the time to activate the deployment artifact for the deployment is a minimum time that the application is not stopped for execution to not incur downtime.

4. A system comprising:
   a memory;
   a processing device communicably coupled to the memory to:
   receive a request for deployment of an application source code in a node, wherein the node is provided by a multi-tenant Platform-as-a-Service (PaaS) system, wherein each gear of a plurality of gears is a resource-constrained process space on the node to execute functionality of an application, wherein a first gear hosts a currently-executing application;
   convert the application source code into a build result prepared for distribution as a deployment artifact by implementing a first functionality on the application source code; and
   activate the deployment artifact for the deployment in the node without downtime by implementing a deployment functionality on the deployment artifact, wherein the processing device to activate comprises the processing device to
   store the deployment artifact in a temporary location, wherein the temporary location comprises a deployment directory;
   stop execution of the currently-executing application in the first gear;
   copy the deployment artifact from the temporary location into the first gear; and
   restart the first gear for execution of the deployment artifact.

5. The system of claim 4, wherein time to activate the deployment artifact for the deployment comprises:

$$Tinp(\text{deploy})=(N(\text{gears})/(N(\text{extra\_cap})+N(\text{fraction}))-1)*(T(\text{gear\_activate}))$$

where N(gears) is number of gears in the application, N(extra_cap) is extra capacity in number of gears, N(fraction)

equals N(gears)*number of gears that are allowed to be down at any given point in time, and T(gear_activate) is a time to swap the artifact to a newly deployed version and restart the first gear, wherein the time to activate the deployment artifact for the deployment is a minimum time that the application is not stopped for execution to not incur downtime.

6. The system of claim 4 wherein the deployment of the application source code comprises at least one of creation of a new application or updating the currently-executing application.

7. A non-transitory machine-readable storage medium comprising data that, when accessed by a processing device, cause the processing device to:
  receive, by the processing device, a request for deployment of an application source code in a node, wherein the node is provided by a multi-tenant Platform-as-a-Service (PaaS) system, wherein each gear of a plurality of gears is a resource-constrained process space on the node to execute functionality of an application, wherein a first gear hosts a currently-executing application;
  convert the application source code into a build result prepared for distribution as a deployment artifact by implementing, by the processing device, a first functionality on the application source code; and
  activate the deployment artifact for the deployment in the node without downtime by implementing, by the processing device, a deployment functionality on the deployment artifact, wherein the processing device to activate comprises the processing device to:
  create a second gear to host the deployment artifact;
  copy the deployment artifact into the second gear;
  execute the deployment artifact in the second gear; and
  delete the first gear after execution of the deployment artifact in the second gear.

8. The non-transitory machine-readable storage medium of claim 7 wherein the deployment of the application source code comprises at least one of creation of a new application or updating the currently-executing application.

9. The non-transitory machine-readable storage medium of claim 7, wherein time to activate the deployment artifact for the deployment comprises:

$$Tsp(\text{deploy}) = (N(\text{gears})/N(\text{extra\_cap}) - 1) * (T(gear\_\text{create}) + T(gear\_\text{deploy}) + T(gear\_\text{activate}))$$

where N(gears) is a number of gears in the application, N(extra_cap) is an extra capacity in number of gears, T(gear_create) is a time to create the second gear with an instance of cartridges, T(gear_deploy) is a time to copy the deployment artifact onto disk from the source, and T(gear_activate) is a time to swap the artifact to a newly deployed version and start the second gear, wherein the time to activate the deployment artifact for the deployment is a minimum time that the application is not stopped for execution to not incur downtime.

* * * * *